March 6, 1945. G. WILDERS 2,371,091
KNITTING MACHINE SCREW-RACKING MECHANISM
Filed Aug. 25, 1943
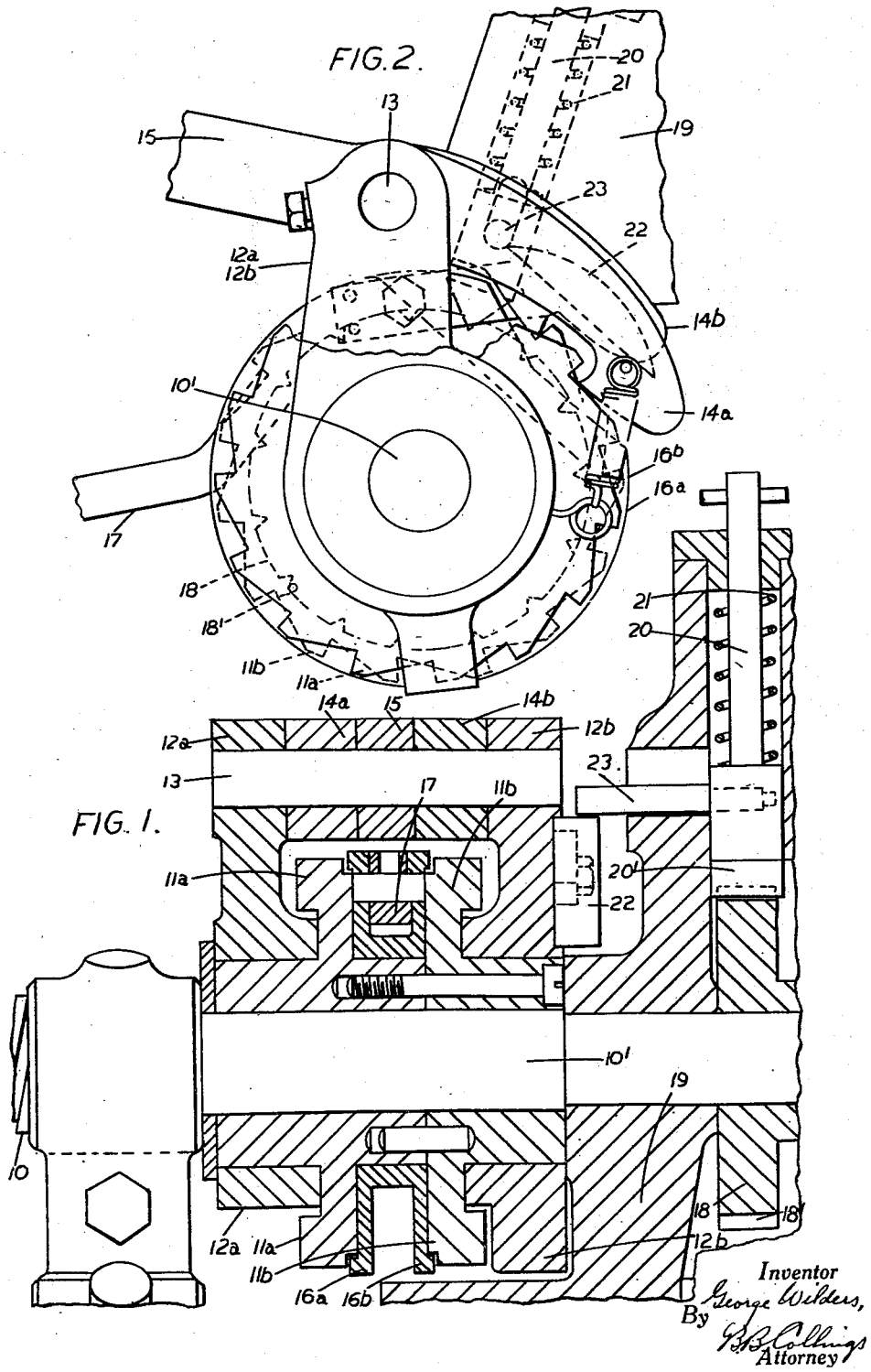
Inventor
George Wilders,
By G. B. Collings
Attorney Patented Mar. 6, 1945

2,371,091

UNITED STATES PATENT OFFICE 2,371,091

KNITTING MACHINE SCREW-RACKING MECHANISM

George Wilders, Kegworth, England, assignor to William Cotton Limited, Loughborough, England Application August 25, 1943, Serial No. 499,978
In Great Britain June 18, 1942

2 Claims. (Cl. 66—89)

This invention is for improvements in and relating to Cotton's patent and other straight bar knitting machines, and is specifically concerned with screw racking mechanism of the type comprising a rack wheel for rotating the screw, a pawl or clawker for racking the rack wheel, and spring-loaded locking mechanism for locking the rack wheel in any one of a plurality of predetermined positions for the purpose of ensuring accurate racking of the screw. Mechanism of this type is commonly employed for racking the narrowing fingers, and the carrier end stops. The pawl or clawker is moved in one direction by a cam and in the other direction by a return spring, which latter serves to hold a truck or other cam follower against the periphery of the cam. In general the difficulty arises that at the commencement of each racking motion the spring-loaded locking mechanism is forcibly disengaged solely by the rotary motion imparted to the rack wheel. For example, in a common construction wherein the spring-loaded locking mechanism comprises a disc having equally spaced notches at its periphery and a spring-loaded plunger for engaging these notches and for thereby locking the disc, rackwheel, and screw, the rotation imparted to the rack wheel and disc forces the plunger out of a notch against the action of the plunger spring. This of itself is a disadvantage owing to the power expended, but it further frequently occurs that the racking motion whereby the spring-loaded locking mechanism is released is produced, not by the positive operation of the cam on the lever or other mechanism for driving the clawker, but by the operation of the return spring endeavouring to hold the cam follower against the periphery of the cam. This state of affairs most commonly arises when the mechanism is constructed to provide a back rack as well as a forward rack, and owing to the effort needed to disengage the spring-loaded locking mechanism it frequently occurs that the cam follower fails to follow the periphery of the cam accurately.

According to the present invention there is provided in a Cotton's patent or other straight bar knitting machine, screw-racking mechanism of the type specified, charaterised by release mechanism for releasing the locking mechanism at each racking operation of the pawl or clawker. This release mechanism may be arranged to function during an idle initial portion of the racking stroke of the pawl or clawker.

As will be understood from the foregoing discussion an important application of the invention is to mechanism wherein motion of the clawker, in one direction, is derived from a spring. A further important application is to mechanism of this character, comprising means for racking the screw in either direction, and wherein the racking motions imparted in one direction to a pawl or clawker are derived from a spring. In general this mechanism will comprise two oppositely-acting pawls or clawkers, which may act on a common rack wheel but preferably each on its own wheel.

Although the invention may be applied to mechanism for racking the carrier end stops, mechanism of the type specified, for racking the narrowing fingers, will now be described with reference to the accompanying drawing as an example incorporating the foregoing and other features of the invention. In the drawing, only those parts of the machine that are necessary to an understanding of the invention are shown:

Figure 1 is a sectional elevation through the mechanism, and

Figure 2 is an elevation looking from the left in Fig. 1.

In this construction the screw 10 by which the narrowing fingers (not shown) are adjusted has two oppositely-directed rack wheels or ratchet wheels 11a, 11b attached, side by side, to a plain portion 10' of its shaft. Freely mounted for oscillation about the shaft axis, there is a clawker-support comprising two arms 12a, 12b located one at either side of the two rack wheels and connected at their extremities by a pivot pin 13 which carries two clawkers, a forward-racking clawker 14a co-operating with rack wheel 11a and a back-racking clawker 14b co-operating with the other rack wheel 11b. The said pin 13 is also connected by a pivoted link 15 to a rack lever having a truck which is urged by a return spring against the periphery of a racking cam on the main cam shaft (this connection is well understood and needs no illustration herein). It will therefore be appreciated that as the cam rotates the clawkers 14a, 14b are oscillated to and fro and according to whichever one of them is permitted to engage its rack wheel the narrowing screw 10 is racked forwards or backwards. The selection of the clawkers is effected by means of a bluff which is adjustable about the screw shaft in any suitable manner. Bluffs 16a, 16b are shown, operable to bluff either of the clawkers 14a, 14b, by means of a connection 17 that may be actuated in known manner from a patterning mechanism such as a chain or its equivalent.

In order to ensure that each rack exactly equals one or any other pre-arranged number of needle spaces, and in order to prevent movement of the rack wheels 11a, 11b and screw 10 during the idle movement of the operative clawker, there is also attached to the screw shaft 10' a locking disc 18 having equally spaced V-shaped notches 18' cut in its periphery, one notch for each tooth on the rack wheels. For example the spacing between successive notches may correspond to a one-needle rack of the screw 10. On a suitable stationary part, such for example as a bearing 19 for the screw shaft, a slidable plunger 20 is mounted which is urged by a compression spring 21 against the periphery of the notch disc 18 so that at the end of each rack a V-shaped nose 20' of the plunger slips into one of the notches 18' and locates the screw 10.

It will be appreciated that if the racking cam acting directly on the truck effects the operative movements of the forward-racking clawker 14a then the operative movements of the back-racking clawker 14b are effected by the return spring which causes the truck to follow the contour of the racking cam. Therefore at the commencement of each back rack the said return spring has to exert sufficient force that the notch disc 18 is turned beneath the racking plunger 20 and the latter is forced out of its notch 18' against the action of the plunger spring 21. The follower spring may on occasion be of insufficient strength to carry out this duty and therefore, in the construction according to the present invention, attached to the clawker arm 12b there is a sickle-shaped cam plate 22 which at the commencement of movement of said arm 12b in either direction (i. e. irrespective of whether a forward rack or a back rack is being made) engages beneath a pin 23 projecting from the locking plunger 20 (and constituting a release abutment) and raises the plunger from engagement with the notch wheel 18. The plunger 20 is raised during an idle initial portion of the operative stroke of the clawker, and therefore when the selected clawker engages a tooth on its rack wheel, the rack wheel and screw 10 are free to turn. At the end of the stroke of the clawker the latter is disengaged from its rack wheel by its bluff and the sickle cam 22 passes from beneath the pin 23 and the plunger 20 is released to engage the notch wheel 18. During the inoperative return stroke of the clawker the sickle cam 22 likewise raises the plunger 20, but a friction brake may be provided for preventing movement of the rack wheels during this period.

I claim:

1. In a Cotton's patent or other straight bar knitting machine, screw-racking mechanism comprising the screw, a forward-racking and a back-racking clawker wheel connected to the screw to rack it forwards and backwards, said clawker wheels being co-axial, a clawker-support oscillatable about said axis, a connection for oscillating said support, a forward-racking clawker and a back-racking clawker carried by said support for racking the respective clawker wheels during opposite strokes of the support, bluffing means for bluffing either clawker selectively, a notch wheel connected to the clawker wheels, a spring-loaded plunger releasably engaging the notch wheel to lock it against rotation, a release abutment connected to the plunger, and a cam connected to the clawker-support and oscillatable therewith for engaging said abutment at each stroke and for thereby releasing the plunger during a portion of each stroke.

2. In a straight bar knitting machine, screw-racking mechanism comprising pawl-and-rack-wheel mechanism for racking the screw forwards or backwards as required, a pawl-moving member movable to-and-fro to produce a forward rack by movement in one direction and a back rack by movement in the other direction. a bluff for selectively bluffing the last-said mechanism to produce a forward or a back rack as required, spring-loaded locking mechanism for locking the screw in any selected one of a plurality of positions; and means for releasing the locking mechanism during each racking stroke, which means comprises a releasing member movable to-and-fro with the pawl-moving member.

GEO. WILDERS.